3,479,944
APPARATUS FOR CONTROLLING THE FOCUSING MECHANISM OF A CAMERA
John Denzil Barr, Oadby, England, assignor to The Rank Organisation Limited, London, England
Filed Oct. 13, 1966, Ser. No. 586,432
Claims priority, application Great Britain, Oct. 15, 1965, 43,872/65
Int. Cl. G03b 3/10
U.S. Cl. 95—45                                21 Claims

ABSTRACT OF THE DISCLOSURE

The focusing mechanism is intended primarily for use with television or cinematograph cameras. The apparatus provides the usual manual focus control by means of a main focus adjustor and additionally it provides an auxiliary focus adjustor which may be preset and then subsequently actuated to automatically change the focus to the preset condition. Two main embodiments of the mechanism are described: one in which the auxiliary focus control takes the form of an electrical circuit of two potentiometers and two summing resistances, the other or mechanical embodiment in which the auxiliary focus control takes the form of a heart shaped cam mounted on the main focus adjustor shaft.

---

Figure 1:
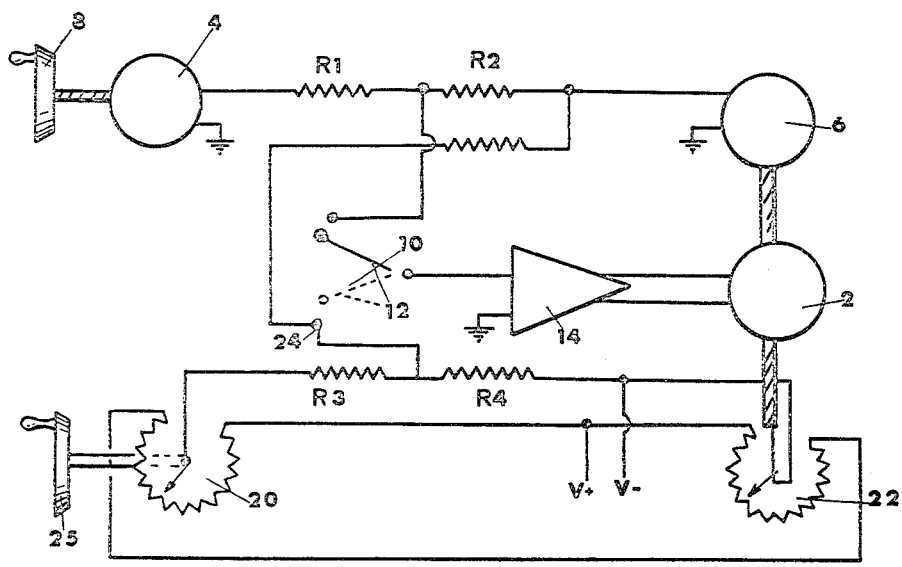

This invention relates to apparatus for controlling the focusing mechanism of a camera, for example a television or cinematograph camera and preferably (but not necessarily) one fitted with a zoom objective that is an objective including members relatively movable under the control of a zoom element for effecting continuous variation of the equivalent focal length of the objective throughout a range whilst maintaining constant the position of the resultant image plane.

It is often the practice, when using a cinematograph or television camera for the operator to view the object through a viewfinder or on a monitor screen and to operate the focusing mechanism, as may be necessary, in accordance with the observed scene, without making use of focusing scales. This calls for great skill, when the object distance changes.

A more serious difficulty arises, when the camera is provided with a zoom objective, for the depth of focus of a zoom objective varies greatly during a zooming movement and is many times greater at the wide angle or low equivalent focal length end of the range than it is at the narrow angle or high equivalent focal length end. Thus, if during operation, the objective is in a wide angle condition when a particular object is first brought into focus, it may go out of focus during zooming to a narrower angle condition, and it is extremely difficult for the operator to correct the focusing during the course of a fast zooming operation. So long as the object distance does not change, this difficulty can be avoided by taking care to focus on the object when the objective is in a narrow angle condition, before proceeding to the actual shooting of the scene, and leaving the focus setting unaltered throughout the operation. The difficulty still remains, however, if the object distance changes during the course of the actual shooting.

The present invention has for its object to provide an improved controlling apparatus for a camera focusing mechanism, wherein these and other difficulties are satisfactorily overcome.

The controlling apparatus according to the invention comprises a focus-determining part for actuating the focusing mechanism, a main focus control for driving the focus-determining part at a speed dependent upon the speed of operation of a main focus adjustor, an auxiliary focus control for so driving the focus-determining part that the position of the focus-determining part is dependent on the position of an auxiliary focus adjustor, and means whereby the control of the focus-determining part can be transferred from the main focus control to the auxiliary focus control.

Generally, camera focusing mechanism includes a part of the lens system movable to determine focus setting. According to the invention there is provided apparatus for controlling the positioning of a focus-determining part of the lens system of a camera, for example, a television or cinematograph camera with zoom facility, comprising a reversibly drivable actuator for producing movement of the focus-determining part, a reversibly movable main focus adjustor, means responsive to movement of the main focus adjustor for causing the actuator to be driven in accordance with the movement of the main focus adjustor, at least one auxiliary focus adjustor presettable to position representing a desired focus setting, at least one temporarily operable means for bringing the auxiliary focus adjustor into operative coaction with the actuator causing the latter to bring the focus-determining part to a position corresponding to the preset position of the auxiliary focus adjustor, the main focus adjustor being subsequently operative from the latter position of the focus determining part.

Such apparatus may comprise two or more auxiliary focus adjustors presettable to different positions representing desired focus settings and each brought into said operative coaction with the actuator by individual ones of said temporarily adjustable means.

One advantageous type of embodiment provides apparatus for controlling the positioning of a focus-determining part of the lens system of a camera, for example, a television or cinematograph camera with zoom facility, comprising a reversibly drivable actuator for producing movement of said focus-determining part, a reversibly movable, variable speed, main focus adjustor, means responsive to movement of the main focus adjustor for generating a signal representative, by its magnitude, of the speed of that movement and, by its polarity, of the direction of that movement, means for applying said speed-representative signal to drive the actuator at a speed and in a direction in accordance therewith, at least one auxiliary, variable position, focus adjustor presettable to a position representing a desired focus setting, means for generating a signal representing the preset position, and at least one temporarily operable emeans for applying said preset position representing signal to the actuator driving the latter to bring said focus-determining part to the desired focus setting.

As used herein, the focus-determining part is often referred to as "the driven element," the main focus adjustor as "the primary demand element," the auxiliary focus adjustor as "the auxiliary demand element" and the temporarily operable means as "transfer means."

It is to be noted that with a speed-type control, as contrasted with a positional control, the position of the focus-determining part will not usually remain in accurate correspondence with that of the main focus adjustor for any very long period, for various circumstances can arise to cause positional errors which are not made good. This would at first sight appear to be disadvantageous, but in fact it does not give rise to harmful consequences, especially when the operator effects the necessary control in accordance with visual observation of the scene to be photographed, and indeed it has important advantages in other respects.

For instance, it enables certain difficulties to be avoided, which would arise if the main focus control were of the positional type. Thus, in such case, if the transfer means were controlled by a press-button, as will usually be most convenient, the operator must hold the button depressed (if it is not of a self-holding type) as long as it is desired to maintain the auxiliary focus control in operation, which would render difficult any necessary corrections of focusing to be effected meanwhile. This is especially so when the objective is of the zoom type for the operator will usually need one hand for zoom control, so that only the other hand is available for operating the focus adjustors and the transfer button. If a self-holding type of button is used, such focusing corrections can be effected by operation of the auxiliary focus adjustors, but it would be very confusing to the operator to have to use different focus adjustors at different times for effecting similar operations, and serious errors could arise from operating the wrong focus adjustor. In any event, on release of the button, the focusing determining part would return to the position occupied immediately prior to the transfer, which would seldom be desirable.

With a speed-type primary control, on the other hand, the focus-determining part remains in position on release of the button, and the main focus control is immediately available to deal with any focusing changes required. Moreover, the auxiliary focus adjustor need never be operated during the actual shooting of a scene, for operation and quick release of the transfer means is all that is needed for making a quick change to suit a different object distance, and the full control of focusing requirements can, in other respects, be effected wholly by operation of the main focus adjustor, the auxiliarly focus adjustor being used only at leisure for effecting a desired presetting to a particular object distance.

The focus determining part is preferably driven by a reversible electric motor. The speed of the motor is preferably determined, when the main focus control is in operation, by a mixed electric control in accordance partly with the speed of operation of the main focus adjustor and partly with the speed of the motor itself. Conveniently, the motor speed may be determined by a mixed voltage derived from the outputs of two tachogenerators driven respectively by the main focus adjustor and by the motor. It should be mentioned that the term "tachogenerator," as herein used, is intended to cover any device whether strictly a generator or not, which gives an output voltage dependent on the speed at which the device is driven. Alternatively, the speed of the reversible motor may be determined, when the main focus control is in operation, by the frequency of pulses generated by a pulse generator in accordance, at least in part, with the speed of operation of the main focus adjustor.

The auxiliary focus control may be arranged in various ways to give the desired positional control. In one convenient arrangement, such device comprises a source of power, a potentiometer energised from such source and having a wiper whose position is determined by the position of the auxiliary focus adjustor and a second potentiometer energised from the source and having a wiper whose position is determined by the position of the focus-determining part, the focus-determining part being driven by a reversible electric motor whose speed is controlled jointly by the outputs of the two potentiometers. A small voltage derived from the output of a tachogenerator driven by the electric motor is preferably also applied to the motor for damping purposes. As has been mentioned, the depth of focus of the camera objective, when of the zoom type, varies greatly in different positions in the range of variation of the equivalent focal length so that the sensitivity of the focusing control is very different at the two ends of the range. The focusing control operations can, if desired, be simplified by incorporation in the main focus control of an arrangement in accordance with the invention described in application S.N. 338,147 filed Jan. 16, 1964, by John D. Barr and Dexter R. Plummer. In such an arrangement, means are provided whereby movement of the zoom control element also acts to vary an effective transmission ratio in the transmission between the primary demand element and the focus-determining part. Such means may, for instance, be constituted by a potentiometer energised from the output of the tachogenerator above-mentioned driven by the reversible electric motor.

Since the position of the focus-determining part does not necessarily correspond to that of the main focus adjustor, there is risk that the operator may continue to operate such focus adjustor when the focus-determining part has reached the end of its travel in one direction or the other. Noise or possibly damage might thus arise from impact of the focus-determining part or a member driven thereby with an end stop, especially if the movement is at relatively high speed. This may be avoided by incorporation in the main focus control of an arrangement in accordance with the invention described in application S.N. 341,963 filed Mar. 2, 1964, by Dexter R. Plummer. In such arrangement, means responsive to the position of the focus-determining part are provided for reducing the speed of movement of the focus-determining part to a relatively small value when such element is nearing the end of its travel in either direction. Such means may include a potentiometer, which reduced the speed as the focus-determining part approaches the end stops.

Figure 2:
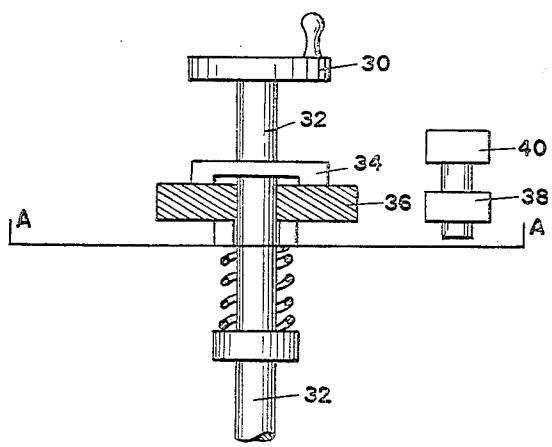
Figure 3:
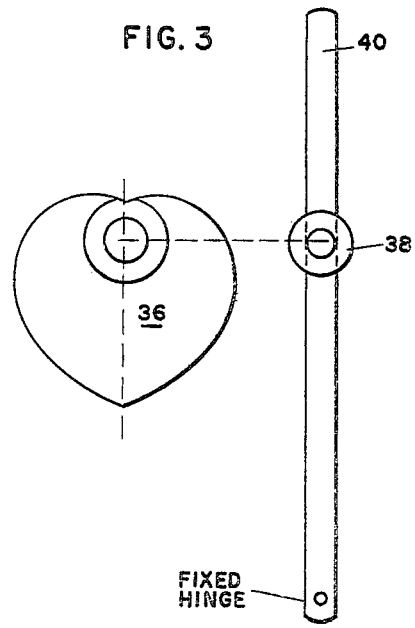

Embodiments of the invention will now be particularly described by way of example with reference to the accompanying drawing in which FIGURE 1 is a schematic representation of an electrical arrangement for producing focusing control; FIGURE 2 is a schematic representation inside view of a mechanical arrangement for producing focusing control, and FIGURE 3 is an end on view of the arrangement shown in FIGURE 2 and taken along the line A—A.

Referring first to FIGURE 1, this arrangement, although generally applicable to any camera objective having a member or members moveable for focusing purposes, will for convenience be described with reference to the focusing control of a zoom objective wherein usually the front member or a part of such member is axially movable, independently of the zooming movements for effecting focusing of the objective on the object being photographed.

In this arrangement, the focus determining part of the focus control apparatus is driven by a reversible electric motor 2 in one direction or the other, and acts through suitable gearing (not shown) to drive the member of the objective movable for focusing purposes.

The main focus control includes two tachogenerators 4 and 6 respectively driven by a handwheel 8 (constituting the main focus adjustor through step-up gearing (not shown) and by the reversible motor 2. One output terminal of each tachogenerator is earthed, the other terminal of each tachogenerator being connected through a resistance R to the normally closed contact of a push button switch indicated generally at 10 or relay operated by the push button switch. The moveable contact arm 12 of this switch is connected to one of the input terminals of an amplifier 14 whose other terminal is earthed, the output of the amplifier 14 being applied to the reversible motor 2 for controlling the speed thereof.

Thus, if the handwheel is rotated at a chosen speed in one direction or the other, when all the parts of the main focus control are at rest, a voltage, whose polarity is dependent on the direction of rotation is applied through the amplifier 14 to the motor 2 which starts up in the appropriate direction to drive the focus-determining part and the associated tachogenerator 6. The latter thus applies to the amplifier 14, an opposing voltage, which increases as the motor speed quickly builds up until a stable condition is reached in which the motor speed is proportional to the speed of rotation of the handwheel 8. The parts of the device are so designed that the motor responds almost instantaneously to the starting up of the handwheel and to changes in speed thereof. As soon as the desired focusing adjustment has been effected, the handwheel 8 is stopped, and the motor-driven tachogenerator 6 thus applies a relatively large voltage in a direction to stop the motor, so that the motor 2 comes to rest almost instantaneously after the handwheel 8 stops rotating. Further focusing adjustments which become necessary, are effected in a similar manner by rotating the handwheel in the appropriate direction.

In the event of a sudden change in object distance, as when the camera objective is to be focused on a different object, the press-button switch 10 is depressed to open a normally-closed contact, thereby cutting out the main focus control, and to close a normally-open second contact, thereby bringing the auxiliary focus control into operation.

This auxiliary focus control comprises two equal potentiometers 20 and 22 energised from a suitable D.C. source, V+ and V— the wipers of the two potentiometers being connected through summing resistances R3 and R4 to the second contact 24 of the push-button switch 10. The potentiometers are connected in opposite senses, so that in the normal zero positions of the two wipers, no voltage is applied to the amplifier. The wiper of potentiometer 20 is dependent on the position of a hand knob 25 (constituting the auxiliary focus adjustor) which has been pre-set to a chosen position corresponding to suit the particular object distance, on to which the objective is to be focused. The wiper of the other potentiometer 22 is dependent on the position of the focus-determining part, and since at the moment of operation of the push-button switch 10 such position corresponds to an object distance substantially different from the desired new object distance, a voltage will be applied to the amplifier of such polarity as to start up the motor in the appropriate direction. When the wiper of the potentiometer 22 controlled by the focus-determining part reaches the position corresponding to the preset position of the other potentiometer wiper, the voltage applied to the amplifier will fall to zero and the motor will stop. In order to guard against overshooting the correct position of adjustment, an additional relatively small damping voltage is applied to the amplifier in the appropriate direction. This damping voltage is derived through a high resistance from the tachogenerator 6 driven by the motor. The parts of the auxilary focus control are so dimensioned that the desired focusing change is effected very quickly, so that depression and quick release of the push-button switch is adequate to effect the desired focusing change, the control thus reverting to the main focus control.

If desired, there may be a number of such auxiliary focus control devices, each with its own press-button switch acting to cut out the main focus control and to bring the associated auxiliary focus control into operation. This makes it possible to preset the various devices to suit a number of different object distances, and to select whichever of them is required at any moment.

It will be appreciated that the arrangement of the auxiliary focus control above described has been given by way of example only and that such device may be arranged in other ways such as to ensure that the position of the focus determining part is dependent upon the position of the auxiliary focus adjustor.

Likewise, the main focus control may be arranged in ways other than that above described to ensure that the speed of the focus-determining part will be dependent on the speed of operation of the main focus adjustor. For example, such main focus control may be arranged in any of the ways described in the above-mentioned application S.N. 341,963.

Since the main focus control exercises a control in accordance with the speed of operation of the main focus adjustor and there is no certainty of correspondence between the positions of such focus adjustor and of the focus determining part, there is risk that the operator might continue to operate the focus adjustor, perhaps at high speed, when the focus-determining part has reached the end of its travel in either direction. This might result in noise or possibly damage to the apparatus by impact of the focus-determining part or of a part driven thereby with an end stop. To prevent this, the main focus control preferably incorporates one or other of the appropriate arrangements described in the specification of British patent application No. 4,640 of 1963, in which means responsive to the position of the focus-determining part are provided to reduce the speed of movement of the focus determining part to a relatively small value when such part is nearing the end of its travel in either direction. In one such arrangement, the said means comprises a potentiometer driven by the reversible electric motor, the arrangement being such that the wiper reaches the end of the potentiometer winding at the same time as the focus-determining part reaches the end of its travel, in each direction, The two ends of the potentiometer are connected to earth through resistances and are also respectively connected through two opposite diodes to the input of the amplifier via a normally closed contact on the push-button switch or on a relay operated by the push-button switch. The wiper of the potentiometer is connected directly to the unearthed output terminal of the tachogenerator driven by the reversible motor. In this way an overriding control is imposed on the motor whereby when the wiper is nearing either end of its travel, the speed of the motor is decelerated to a relatively small value, so that risk of a heavy and thus noisy impact with an end stop, if the operation of the main focus adjustor is continued too far, is eliminated.

It will be appreciated that the foregoing arrangements may be modified within the scope of the invention in various ways, other than those above described. Thus, for example, alternating current may be used instead of direct current, if desired.

Referring now to the mechanical arrangement of the invention shown in FIGURES 2 and 3, these figures show a main focus adjustor and a secondary focus adjustor which may be used, for example, for effecting focusing. In focusing operations it is advantageous for the operator to have the facility to move a focus-determining part to one or more preset positions without, at the actual time of shooting, having recourse to focusing scales. This facility is provided by the apparatus which includes a main focus adjustor or demand operating handwheel 30 which is coupled to a shaft 32 and to the lens focusing mechanism by a spring-loaded slipping clutch 34 to a heart-shaped cam 36. A cam follower 38 normally spring-loaded away from the cam can be pressed into contact with the cam by means of a hand or finger operated lever 40. If demand wheel 30 is released the operation of this lever causes the heart-shaped cam to rotate to a datum position. With the lever held in this position the handwheel 30 can be turned to focus the lens on a specific object, the pressure on the lever 40 and the cam follower 38 holding the cam 36 against the rotation so that slip occurs at the clutch 34. The relative position of the cam on the shaft provides the pre-set focus information to enable the focus condition to be recovered when required by releasing the handwheel 30 and operating the lever 40. A plurality of cams each with its own different preset position may be used as in the electrical case to provide a plurality of focus positions to be obtained.

Operation of the device is as follows:

The cam 36 is first preset to a selected angular position with respect to a datum position of the shaft 32, and hence of the focusing element or elements controlled by shaft 32. In the example shown the cam has been preset to such a position that it will be rotated through 90° before the cam follower enters the cam recess, the demand handle 30 having, in the meantime been released so that the cam 36 drives the shaft 32 through the clutch. After the preset position of shaft 32, determined by the cam has been achieved, control may be assumed by the demand handle 30, either with the cam still engaged with follower 38, in which case the clutch will slip, or, alternatively after disengaging the lever 40. The relative position of the cam on the shaft can be preset to provide any positive or negative motion of the shaft 32 up to 180°, such motion being obtained by releasing the handwheel 30 and operating the lever 40. A plurality of cams each with its own different preset position may be used as in the electrical case to provide a plurality of focus positions to be obtained.

In an alternative embodiment of that shown in FIGURES 2 and 3, the spring-loaded clutch may be replaced by a releasable clutch properly coupled to the operating controls. Additional cams to provide a plurality of focus settings could also be added to this embodiment. In addition a calibrated movement between the cam and the shaft could also be provided in order to enable the preset focus conditions to be set without actually pre-focusing. The relative position of the cam and the focus mechanism could in an alternative embodiment be set on a calibrated knob on which either the scale or the index is fixed by introducing a differential gear or its equivalent.

In yet a further alternative mechanical embodiment of the invention, the pre-focus positions are obtained by replacing the cam with a mechanism in which a member or members move along the axis of lens movement to produce the focusing and which includes an axial stop or stops controlling directly the movement of the focusing glasses of the lens system along the axis thereof.

What I claim is:

1. Apparatus for controlling the positioning of a focus-determining part of the lens system of a camera, for example a television or cinematograph camera with zoom facility, comprising a reversibly drivable actuator for producing movement of said focus-determining part, a reversibly movable main focus adjustor, means responsive to movement of the main focus adjustor for causing the actuator to be driven in accordance with the movement of the main focus adjustor, at least one auxiliary focus adjustor presettable to a position representing a desired focus setting, at least one temporarily operable means for bringing the auxiliary focus adjustor into operative co-action with the actuator causing the latter to bring said focus-determining part to a position corresponding to the preset position of the auxiliary focus adjustor, the main focus adjustor being subsequently operative from the latter position of said focus-determining part.

2. Apparatus as claimed in claim 1, comprising two or more auxiliary focus adjustors presettable to different positions representing desired focus settings and each brought into said operative coaction with the actuator by individual said temporarily adjustable means.

3. Apparatus for controlling the positioning of a focus-determining part of the lens system of a camera, for example a television or cinematograph camera with zoom facility, comprising a reversibly drivable actuator for producing movement of said focus-determining part, a reversibly movable, variable speed, main focus adjustor, means responsive to movement of the main focus adjustor for generating a signal representative, by its magnitude, of the speed of that movement and, by its polarity, of the direction of that movement, means for applying said speed-representative signal to drive the actuator at a speed and in a direction in accordance therewith, at least one auxiliary, variable position, focus adjustor presettable to a position representing a desired focus setting, means for generating a signal representing the preset position, and at least one temporarily operable means for applying said preset position-representing signal to the actuator driving the latter to bring said focus-determined part to said desired focus setting.

4. Apparatus as claimed in claim 3 wherein the actuator comprises a reversible electric motor.

5. Controlling apparatus as claimed in claim 4 wherein the motor speed is determined by a mixed voltage derived from first and second speed responsive devices driven respectively by the main focus adjustor and by the motor.

6. Controlling apparatus as claimed in claim 5 wherein the speed responsive devices are tachogenerators.

7. Controlling apparatus as claimed in claim 5 wherein a small signal derived from the output of the motor driven speed responsive device is applied to the motor control voltage to produce a damping effect on the motor.

8. Controlling apparatus as claimed in claim 4 wherein the means for generating a signal representative of the preset position comprises a suitable energized potentiometer.

9. Controlling apparatus as claimed in claim 8 wherein the wiper of the potentiometer is coupled to and is determined by the position of, the auxiliary focus adjustor.

10. Controlling apparatus as claimed in claim 9 wherein a further suitably energized potentiometer has its wiper coupled to the motor so that the speed of the motor is determined by the combined outputs of the potentiometer.

11. Controlling apparatus as claimed in claim 10 including ratio means effective to vary the transmission ratio between the main focus adjustor and the focus-determining part.

12. Controlling apparatus as claimed in claim 11 wherein the ratio means comprise a potentiometer responsive to the speed of the electric motor driving the focus-determining part.

13. Controlling apparatus as claimed in claim 12 including restraining means responsive to the position of the focus-determining part and effective to reduce the velocity of this part when approaching the end of its traverse in any direction.

14. Controlling apparatus as claimed in claim 13 wherein the restraining means comprise a potentiometer coupled to the focus-determining part and effective to reduce the speed of the electric motor driving the focus-determining part as this approaches a limit of its traverse.

15. Controlling apparatus as claimed in claim 4 wherein the electric motor is driven from the output of a signal translation apparatus responsive to signals derived from the main and auxiliary focus adjustors.

16. Apparatus as claimed in claim 1 wherein the main focus adjustor is coupled to the actuator for said focus-determining part by way of a coupling permitting relative displacement therebetween and the auxiliary focus adjustor connected to the actuator is arranged to be movable into a preset position by relative displacement at the coupling, irrespective of the position of the main focus adjustor.

17. Apparatus as claimed in claim 16 wherein the auxiliary focus adjustor comprises adjustable indexing means.

18. Apparatus as claimed in claim 17 wherein the indexing means produce indexing of the actuator and thereby said focus-determining part into one or more preset positions by arcuate movement.

19. Controlling apparatus as claimed in claim 18 wherein the focus adjustor comprises an asymmetrical cam together with a cam follower biased against the cam periphery and arranged when so biased to move the cam to a predetermined position in which it occupies a stable equilibrium position on the cam.

20. Controlling apparatus as claimed in claim 19 wherein the cam is a heart-shaped cam and the stable equilibrium position exists at the reentrant portion of this cam.

21. Apparatus as claimed in claim 20 wherein the coupling comprises a slip clutch.

References Cited

UNITED STATES PATENTS

| | | | |
|---|---|---|---|
| 2,984,154 | 6/1961 | Walker | 95—45 X |
| 3,059,533 | 10/1962 | Mellberg | 95—45 X |
| 3,158,076 | 11/1964 | Back et al. | 95—45 |
| 3,168,610 | 2/1965 | Kende | 95—45 X |
| 3,221,628 | 12/1965 | Mahn | 95—45 |
| 3,351,411 | 11/1967 | Chapman | 95—45 X |

NORTON ANSHER, Primary Examiner

R. L. MOSES, Assistant Examiner